UNITED STATES PATENT OFFICE.

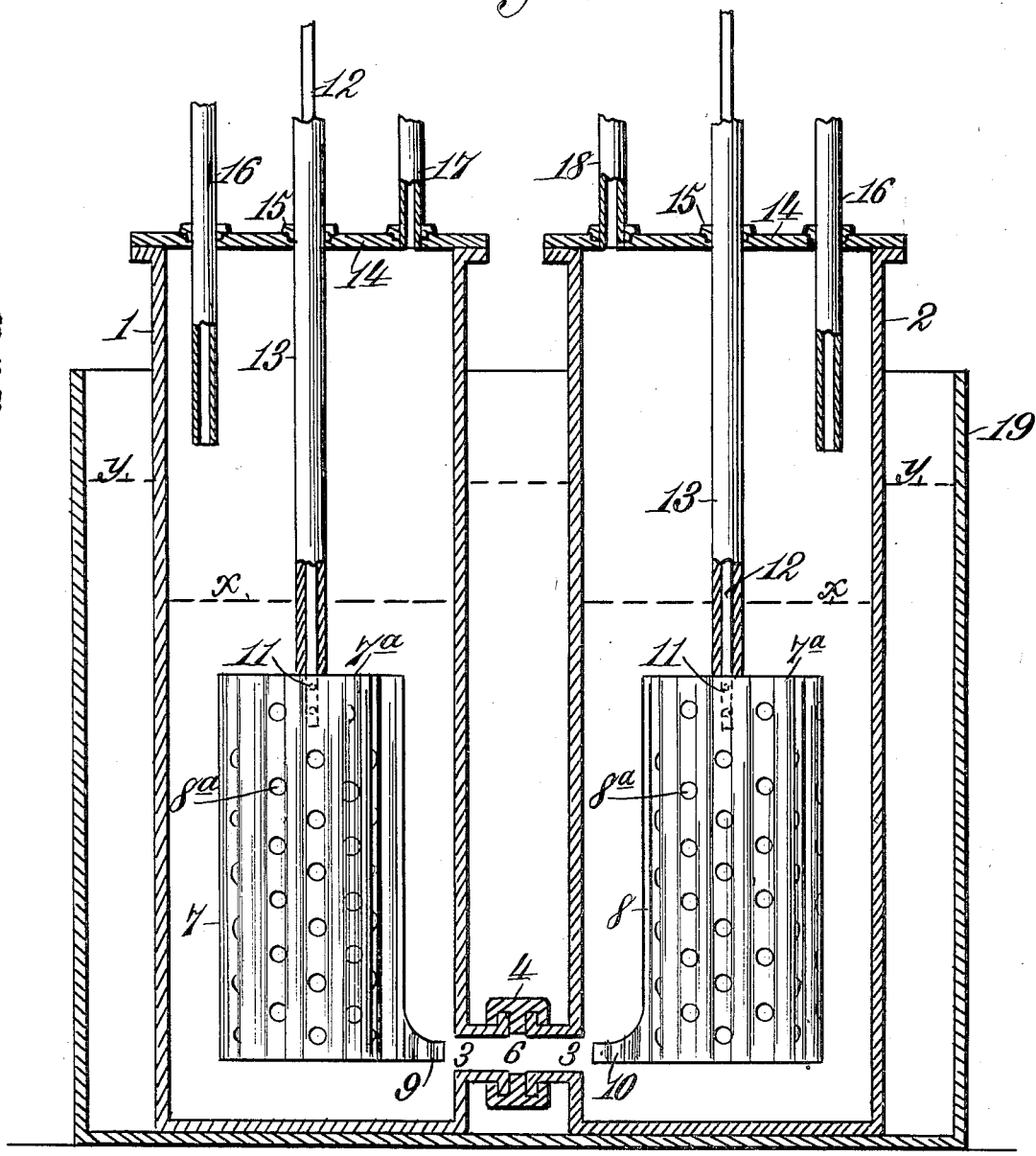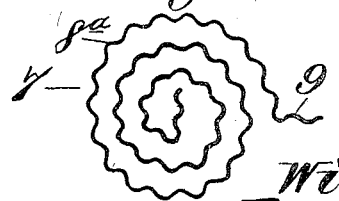

WILLIAM F. M. McCARTY, OF ROCKY RIDGE, MARYLAND, ASSIGNOR TO THOMAS A. DARBY, TRUSTEE, OF NEW YORK, N. Y.

APPARATUS FOR DECOMPOSING WATER BY ELECTROLYSIS.

No. 816,355.     Specification of Letters Patent.     Patented March 27, 1906.

Application filed November 8, 1904. Renewed September 25, 1905. Serial No. 280,058.

*To all whom it may concern:*

Be it known that I, WILLIAM F. M. Mc-CARTY, a citizen of the United States, residing at Rocky Ridge, in the county of Frederick and State of Maryland, have invented new and useful Improvements in Apparatus for Decomposing Water by Electrolysis, of which the following is a specification.

This invention relates to certain new and useful improvements in an apparatus for decomposing water by electrolysis, and has for its object to provide a device in which the construction and arrangement of the parts will enable the decomposition of the water to be accomplished with the minimum amount of current at a low potential and the certain separation and collection of the gases as evolved.

In order that the invention may be fully understood, I have illustrated the same in the accompanying drawings, in which—

Figure 1 is a vertical sectional view of an apparatus constructed according to my invention. Fig. 2 is a plan view of one of the electrodes.

1 2 indicate, respectively, two receptacles or tanks, each of which is provided near its lower end with an outlet-pipe 3, which outlets are connected by means of a rubber or other collar 4 to provide a conduit 6, connecting the two tanks.

7 8 indicate, respectively, two electrodes. These electrodes are each formed from a plate of platinum coiled upon itself a greater or less number of times and provided with corrugations $7^a$ and perforations $8^a$, the lower portion of the outer coil being provided with a projecting portion (illustrated by 9 and 10) on the respective electrodes. The projecting or terminal portion 9 10 of each electrode is located directly opposite the opening in the conduit 6 in the respective tanks, as shown. Secured to the inner coil of each electrode at its upper end, as indicated at 11, is a suitable rod or conductor 12, which is incased in a glass tube 13, the latter passing through the top 14 and being surrounded by a suitable washer or stuffing-box 15 to provide a gastight connection. Extending through each of the tops 14 is a glass tube 16, by means of which the water and the chemical substances employed may be supplied to the tanks, and a glass tube for permitting escape of the gas generated from the tanks, these latter tubes being indicated, respectively, by the numerals 17 and 18. The tanks are supplied with water to about the depth indicated by the dotted line $x$ $x$ and are submerged in an outer tank 19 to about the depth indicated by the dotted line $y$ $y$.

By constructing the electrodes as described I provide a large surface for contact with the water, and by having the terminal portions 9 10 located directly opposite each other at opposite ends of the conduit 6 the current has only a small space to travel through the water, and as the oxygen and hydrogen liberated are attracted to their respective electrodes—the oxygen to the anode 8 and the hydrogen to the cathode 7—said gases will rise vertically through the water in the two tanks and will have no opportunity of commingling.

In actual operation I contemplate adding metallic sodium to the water in the two tanks 1 and 2, and at the moment of ebullition incident to the supply of this substance to the water an electric circuit is closed through the conductors 12, causing a discharge to take place in the water between the terminals 9 10. The process of decomposing water by use of a metallic alkali forms the subject-matter of a separate application for patent filed November 8, 1904, Serial No. 231,940.

In the operation of the device a great amount of heat is generated, and in order to keep the apparatus cool I partly submerge the same in water in the vessel 10, as indicated on the drawings.

The corrugations serve to strenthen the electrodes and to prevent them from losing their shape under the influence of the heat generated, and the perforations permit the bubbles of gas to pass through to the water without having to pass over the entire surface of the electrodes.

Having thus fully described my invention, what I claim as new, and desire to secure by Letters Patent, is—

1. In an apparatus of the class described, a pair of tanks communicating through the medium of a conduit, an electrode suitably connected with a source of electricity suspended in each tank, each of said electrodes having a discharge portion projecting laterally therefrom and located directly opposite one end of said conduit, the said projecting portion of each electrode being directed toward that of the other electrode.

2. In an apparatus of the class described, a pair of tanks communicating through the medium of a conduit, and a spiral electrode suspended in each tank and suitably connected with a source of electricity and having at its lower end a radially-projecting portion located directly opposite one end of said conduit.

3. In an apparatus of the class described, in combination with two tanks communicating through the medium of a conduit, a spiral electrode of large superficial area suspended in each tank and suitably connected with a source of electricity, and provided at one end with a radially-projecting portion located directly opposite one end of said conduit.

4. In an apparatus of the class described, in combination with two tanks communicating near their lower ends through the medium of a conduit, a spiral electrode of large superficial area suspended in an upright position in each tank and connected at its upper end with a suitable source of electricity, each of said electrodes having its outer coil terminating at the lower end of the electrode in a radially-projecting portion extending outward from the coil and having its outer end located directly opposite one end of said conduit.

5. In an apparatus of the class described, a pair of tanks communicating through the medium of a conduit, and a corrugated spiral electrode suitably connected with a source of electricity suspended in each tank, each of said electrodes having a radially-projecting discharge portion located directly opposite one end of said conduit.

6. In an apparatus of the class described, a pair of tanks communicating through the medium of a conduit, and a perforated spiral electrode suitably connected with a source of electricity suspended in each tank, each of said electrodes having a radially-projecting discharge portion located directly opposite one end of said conduit.

7. In an apparatus of the class described, a pair of tanks communicating through the medium of a conduit, and a corrugated and perforated spiral electrode suitably connected with a source of electricity suspended in each tank, each of said electrodes having a radially-projecting discharge portion located directly opposite one end of said conduit.

8. In an apparatus of the class described, a pair of tanks communicating through the medium of a conduit, and a corrugated spiral electrode suspended in each tank and suitably connected with a source of electricity and having at its lower end a radially-projecting portion located directly opposite one end of said conduit.

9. In an apparatus of the class described, a pair of tanks communicating through the medium of a conduit, and a perforated spiral electrode suspended in each tank and suitably connected with a source of electricity and having at its lower end a radially-projecting portion located directly opposite one end of said conduit.

10. In an apparatus of the class described, a pair of tanks communicating through the medium of a conduit, and a corrugated and perforated spiral electrode suspended in each tank opposite one end of said conduit and suitably connected with a source of electricity.

In testimony whereof I have hereunto set my hand in presence of two subscribing witnesses.

WILLIAM F. M. McCARTY.

Witnesses:
  BRUCE S. ELLIOTT,
  GEO. W. REA.